United States Patent [19]

Sasaki et al.

[11] Patent Number: 5,360,253
[45] Date of Patent: Nov. 1, 1994

[54] FITTING ASSEMBLY FOR AN AIR SPOILER

[75] Inventors: Tsutomu Sasaki; Junji Asai, both of Kariya, Japan

[73] Assignee: Kabushiki Kaisha Toyoda Jidoshokki Seisakusho, Kariya, Japan

[21] Appl. No.: 653

[22] Filed: Jan. 5, 1993

[30] Foreign Application Priority Data

Jan. 6, 1992 [JP] Japan .............................. 4-000061[U]

[51] Int. Cl.$^5$ ............................................. B62D 37/02
[52] U.S. Cl. .................................. 296/180.1; 296/152
[58] Field of Search ...................... 296/180.1, 152, 91; 180/903

[56] References Cited

FOREIGN PATENT DOCUMENTS 37463 3/1985 Japan .
47770 3/1985 Japan .
76572 5/1985 Japan .
178287 11/1985 Japan .
201981 12/1986 Japan .

Primary Examiner—David M. Mitchell
Assistant Examiner—Andrew C. Pike
Attorney, Agent, or Firm—Brooks Haidt Haffner & Delahunty

[57] ABSTRACT

In a fitting assembly for securing an air spoiler to a vehicle body, the surface of the air spoiler facing the body includes a contact surface which corresponds to the surface of the vehicle body. A nut is embedded in the air spoiler in such a manner that a side of the nut is exposed facing the body from the contact surface. A positioning pin projects from the contact surface of the spoiler. A receiving recess receives the pin in order to determine the position of the air spoiler, and is formed within the body of the vehicle. A bolt engages the nut, and is tightened to secure the air spoiler to the vehicle body.

10 Claims, 3 Drawing Sheets

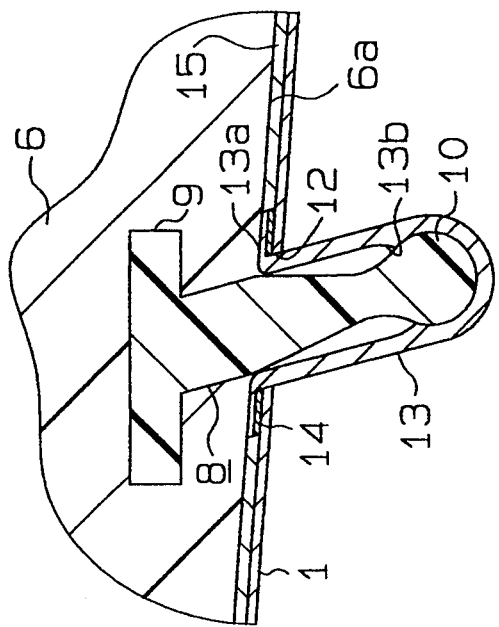
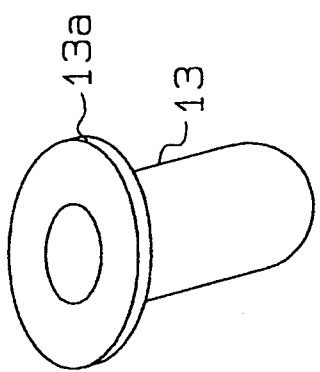
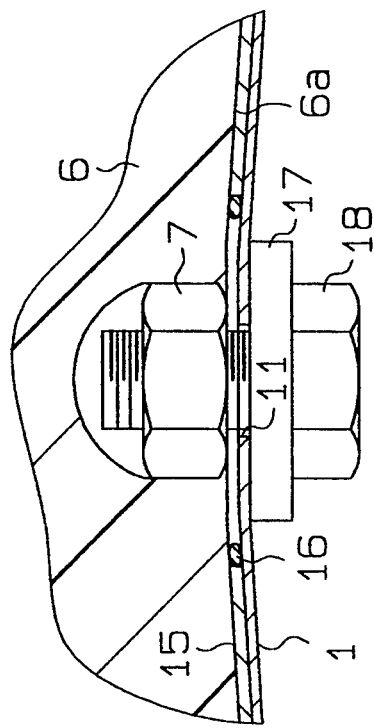

FITTING ASSEMBLY FOR AN AIR SPOILER

BACKGROUND OF THE INVENTION

1. Field of the Invention

The present invention relates to an air spoiler for use on a vehicle. More specifically, the present invention pertains to a fitting assembly for installing the air spoiler.

2. Description of the Prior Art

Driving conditions are rendered less stable when the vehicle body slightly lifts off the ground by air lift, while the vehicle is moving at high speeds. To prevent this condition, an air spoiler is secured to the body in order to control the air flow around the vehicle body, in order to achieve stable driving conditions.

Japanese Unexamined Utility Model Publication No. 2-25381 discloses a fitting assembly for installing a conventional air spoiler on the vehicle trunk. As shown in FIG. 6, a bolt 26 connects the air spoiler 25 and a trunk 27. Further, a holder 28, which is a generally cylindrical tube, is formed in the air spoiler 25.

To install the air spoiler 25 to the body, the bolt 26 is inserted through the trunk 27, and a pin 29 protrudes through the trunk 27, and is inserted into the holder 28, in order to fix the position of the air spoiler 25 with respect to the trunk 27. A nut 30 is then screwed onto the bolt 26 from the rear side of the trunk 27. In this manner, the front portion of the air spoiler 25 is secured by the nut 30, and the rear portion, which is supported by the pin 29, is securely attached to the trunk 27.

The air spoiler 25 is shaped to correspond to the curved surface of the trunk 27. The design limitation is due to the predetermined installation steps of the air spoiler 25. The maximum angle between the axis of the bolt 26 and the axis of the pin 29 is set under 60 degrees. If the angle between both axes exceeds 60 degrees, the pin 29 of the trunk 27 would not fit into the holder 28, after the bolt 26 is inserted through the trunk 27. If the inclination angle of the pin 29 exceeds 60 degrees, the pin 29 of the trunk 27 can not be fitted to the holder 28 of the air spoiler 25.

Further, if the inclination angle of the pin 29 exceeds the permissible value, the air spoiler can not be installed. Therefore, great caution is required when the pin 29 is secured to the trunk 27. Therefore, the installation tends to be more extensive and less efficient.

SUMMARY OF THE INVENTION

Accordingly, it is a primary object of the present invention to provide a fitting assembly for securely installing an air spoiler on almost any curved surface of a vehicle body.

It is another object of the present invention to provide a fitting assembly for efficiently installing the air spoiler on the vehicle body.

To achieve the foregoing and other objects in accordance with the purpose of the present invention, a fitting assembly for securing an air spoiler to a vehicle body is disclosed. The surface of the air spoiler facing the body includes a contact surface which corresponds to the surface of the vehicle body. A nut is secured within the air spoiler and faces the body. A positioning pin extends toward the body from the contact surface. A receiving recess receives the pin in order to determine the position of the air spoiler, and is formed within the body of the vehicle. A bolt engages the nut, and is tightened to secure the air spoiler to the vehicle body.

BRIEF DESCRIPTION OF THE DRAWINGS

The features of the present invention that are believed to be novel are set forth with particularity in the appended claims. The invention, as well as the objects and advantages thereof, may best be understood by reference to the following description of the preferred embodiments together with the accompanying drawings, in which:

FIG. 3 is a partly enlarged cross-sectional view showing a bolt engaging a nut and used in the air spoiler of FIG. 1;

FIG. 4 is a partly enlarged cross-sectional view showing a positioning pin plugged into a cylindrical holder;

FIG. 5 is a perspective view of the cylindrical holder used in the air spoiler of FIG. 1.

DETAILED DESCRIPTION OF THE PREFERRED EMBODIMENT

A preferred embodiment of a fitting assembly for installing an air spoiler according to the present invention will now be described referring to FIGS. 1 through 5.

Figure 1:
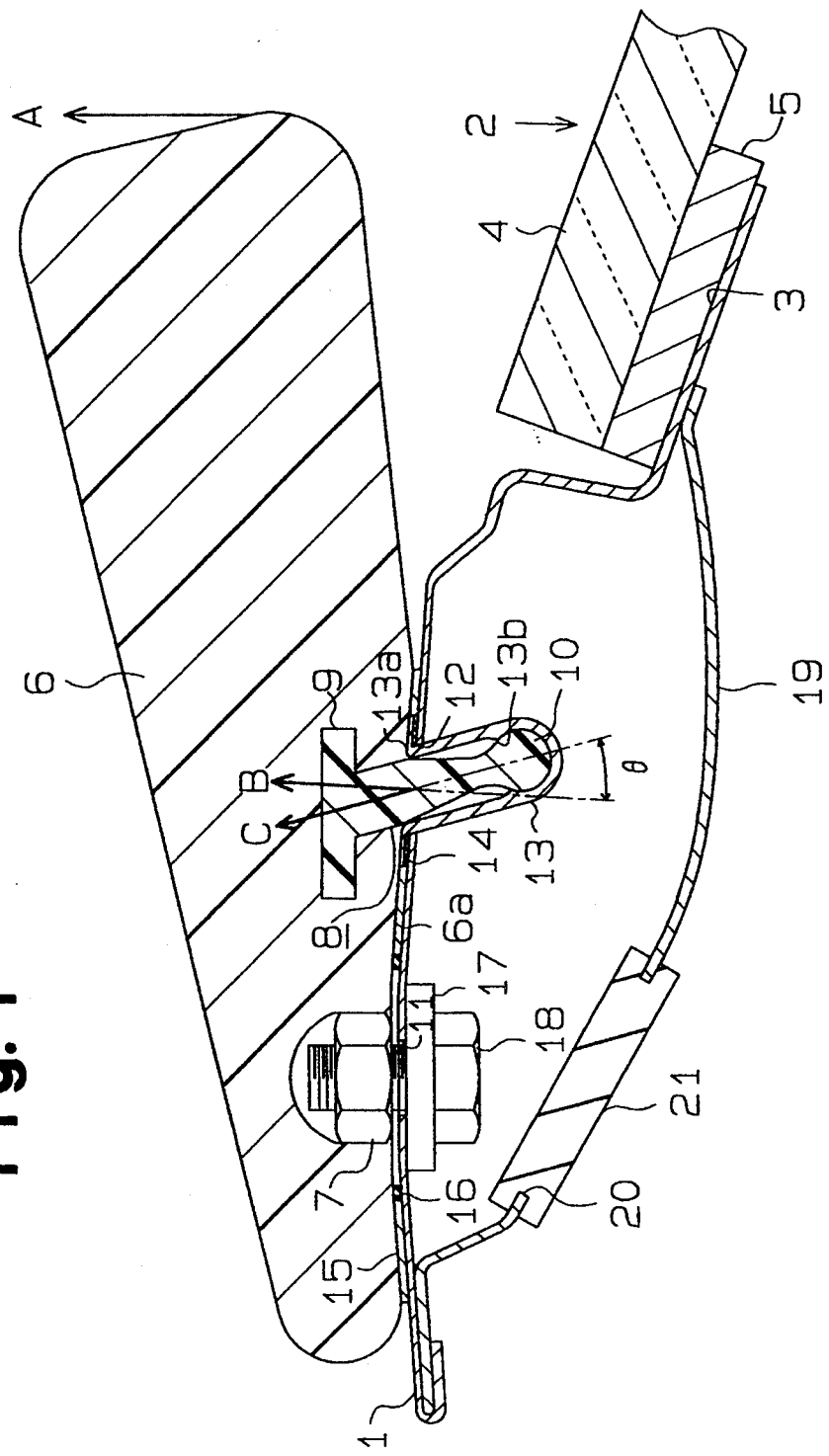
FIG. 1 is an enlarged cross-sectional view of a fitting assembly for installing an air spoiler in accordance with the present invention.
Figure 6:
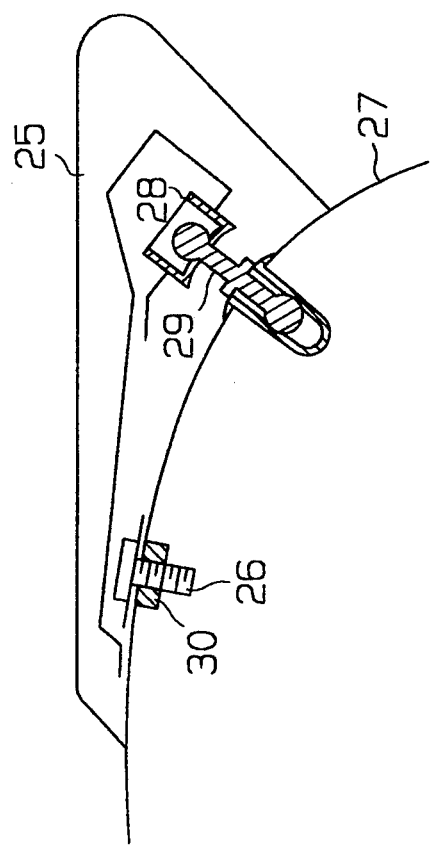
FIG. 6 is a partly cross-sectional schematic view of a conventional air spoiler secured to a vehicle trunk.
Figure 2:
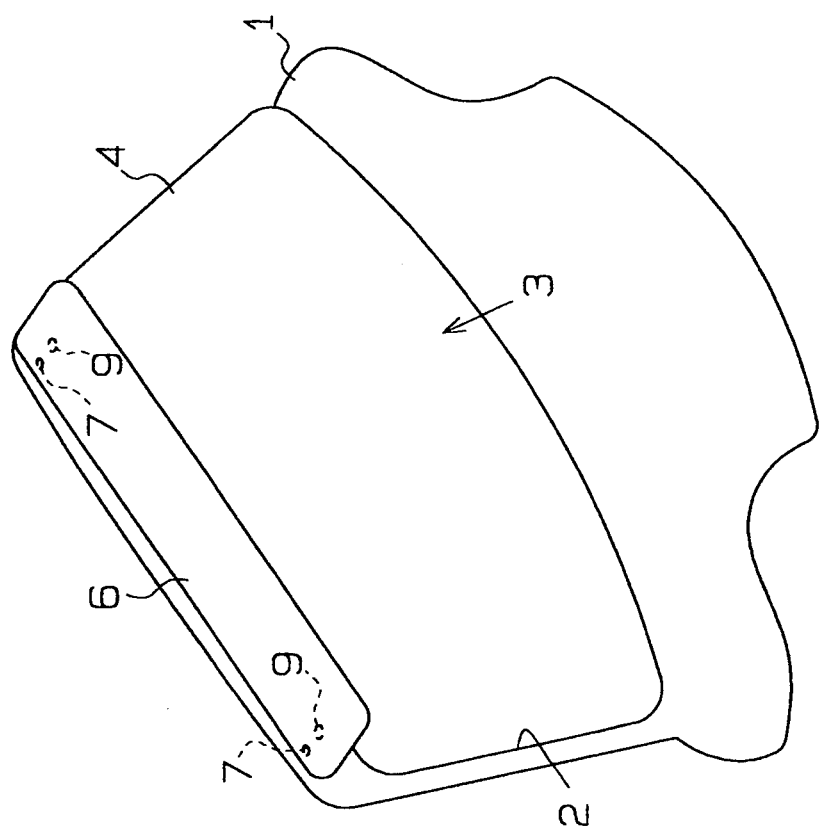
FIG. 2 is a perspective view showing the air spoiler installed on the upper portion of a back door of a vehicle.

As shown in FIGS. 1 and 2, a vehicle back door 1 includes a window 2. A rear glass 4 is adhesively secured by four inner edge portions 3 of the window 2, via sealing elements 5, so as to seal the window 2. An air spoiler 6, horizontally extends along an upper peripheral edge of the window 2, and is secured to the upper portion of the back door 1.

A fitting assembly for installing the air spoiler 6 will now be described. Both distal ends of the air spoiler 6 are identical, and therefore, only one distal end is described.

As shown in FIG. 1, the bottom surface of the air spoiler 6 includes a curved contact surface 6a which conforms to the curved surface of the back door 1. A nut 7 is disposed within the front portion of the air spoiler 6. The lower surface of the nut 7 faces the back door 1.

A positioning pin 8, which is made of synthetic resin, projects downwardly from the rear portion of the contact surface 6a, which has an inclination angle θ with respect to the normal to the surface 6a, and protrudes downwardly. As shown in FIG. 4, a flange 9 is integrally formed at the head portion of the positioning pin 8. The pin 8 is securely retained within the air spoiler 6, by means of the flange 9. A spherical fitting portion 10b is formed at the distal end portion of the positioning pin 8, which extends into a smaller diameter neck portion 10a.

An insertion hole 11 is formed in the upper portion of the back door 1 in registration with the nut 7. Further, a fitting hole 12, through which the pin 8 is inserted, is formed, and a cylindrical holder 13 is pushed therethrough. A flange 13a is formed at the upper distal end portion of the holder 13, and engages the outer peripheral edge of the fitting hole 12, via a seal 14. A clamping portion 13b having a small diameter is formed at the bottom portion of the holder 13. The clipping portion 13b receives the fitting portion 10b of the positioning pin 8. Thus, the positioning pin 8, is not readily detachable from the holder 13 under normal conditions, and is securely held within the holder 13, due to the engagement of fitting portion 10b and the clamping portion 13b.

A double sided adhesive tape 15 is placed between the contact surface 6a of the air spoiler 6, and the front surface of the back door 1. Therefore, the air spoiler 6 is secured to the back door 1, via the tape 15. The airtightedness of the back door 1 is ensured by an O-ring 16 which is placed around the outer peripheral edge portion of the insertion hole 11, and the seal 14 placed around the outer peripheral edge portion of the fitting hole 12. Thus, water and similar fluid do not penetrate through the insertion hole 11 and the fitting hole 12.

A bolt 18 engages the nut 7 via a washer 17, which is placed on the inside of the back door 1, for securing the spoiler 6 to the back door 1.

As shown in FIG. 1, a cover plate 19 is attached to the inside of the back door 1, to cover the holder 13 and bolt 18. An opening 20 is formed in the cover plate 19. The bolt 18 is inserted through the opening 20 for engaging the nut 7. After the bolt 20 is engaged with the nut 7, a plug 21 is installed to cover the opening 20.

The procedure for installing the air spoiler 6 will now be described.

The rear surface of the flange 13a of the holder 13, on which the seal 14 is placed, is inserted into the fitting hole 12. The flange 13a of the holder 13 engages the outer peripheral edge of the fitting hole 12, via the seal 14. The O-ring 16 is placed around the surrounding area of the insertion hole 11, at the upper surface of the back door 1. Thereafter, the adhesive tape 15, is placed on the upper surface of the back door 1 but not over the O-ring 16 or the holder 13.

The positioning pin 8 is then inserted into the holder 13, and is securely held within the holder 13. The air spoiler 6 is temporarily secured to the back door 1 by means of the tape 15, and the nut 7 coincides with the insertion hole 11, such that the O-ring 16 surrounds the insertion hole 11 and the nut 7.

The bolt 18 is then placed on the inside of the back door 1, through the opening 20 of the cover plate 19. The bolt 18 is tightened against the nut 7, via the washer 17. As a result, the air spoiler 6 is secured to the back door 1. The plug member 21 is fitted into the work opening 20 of the covering plate 19, so that the inside of the installation area of the air spoiler 6 in the back door 1 is hidden from the outside, and the installation of the air spoiler 6 is completed.

In this embodiment, as the positioning pin 8 of the air spoiler 6 is inserted into the holder 13, the insertion hole 11 of the back door 1 coincides in registration with the nut 7 without additional labor.

There is no limitation on the inclination angle of the positioning pin 8, with respect to the other parts, because only the positioning pin 8 protrudes from the air spoiler 6. Therefore, the air spoiler 6 can be securely attached to the back door 1, even if the curvature ratio of the back door 1 is increased.

Furthermore, penetration of water and the like through the fitting hole 12 into the back door 1 is prevented by the seal 14. In addition, water penetration through the insertion hole 11 into the back door 1 is prevented by the O-ring 16. Therefore, the back door 1 is protected from corrosion.

As shown in FIG. 1, an external force "A" which is directed in the upward direction relative to the contact surface can be safely applied to the rear portion of the air spoiler 6. Similarly, an upwardly directed external force "B" can be safely applied to the positioning pin 8. However, since the positioning pin 8 having the inclination angle $\theta$, protrudes from the air spoiler 6 (a rear spoiler), the air spoiler 6 can not be detached from the holder 13 by an external force applied thereon, as an external force C which has a similar inclination angle with respect to the inclination angle $\theta$ of the positioning pin 8. As a result, even if the external force A were applied to the air spoiler 6, the air spoiler 6 will not wobble. Therefore, the air spoiler 6 is steadily secured to the back door 1.

Although, only one embodiment of the present invention has been described herein, it should be apparent to those skilled in the art that the present invention may be embodied in many other specific forms without departing from the spirit or scope of the invention. Particularly, it should be understood that the following embodiments are contemplated by the present invention:

Only one positioning pin 8, or a plurality of positioning pins 8 can be formed in the air spoiler 6, instead of two positioning pins 8 formed at both ends of the air spoiler 6, in the width direction, according to the above embodiment.

The fitting assembly can be used for installing an air spoiler as a front side air spoiler or a side air spoiler.

Therefore, the present examples and embodiments are to be considered as illustrative and not restrictive, and the invention is not limited to the details given herein, but may be modified within the scope of the appended claims.

What is claimed is:

1. An arrangement for securing an air spoiler to a vehicle body, comprising:
   an air spoiler including a contact surface corresponding to the shape of the vehicle body on which the spoiler is to be secured;
   engaging means embedded within the air spoiler above the contact surface facing in the direction of said contact surface;
   first positioning means projecting from said contact surface inclined with respect to the normal to the contact surface;
   second positioning means substantially embedded within said vehicle body, for receiving said first positioning means, in order to position the air spoiler; and
   fixing means for securing said engaging means to said vehicle body, said engaging means being engageable from a predetermined position on the surface of said vehicle body when said first positioning means is received by said second positioning means.

2. The arrangement according to claim 1, wherein said first positioning means includes a positioning pin having an inner end portion secured within the air spoiler, and an outer end portion that extends toward the vehicle body from said contact surface; and wherein said second positioning means is a receptacle having a recess for receiving said outer end portion of said pin within the body.

3. The arrangement according to claim 2, wherein said positioning pin includes a generally spherical portion at the end of its outer end portion, and the recess includes a reduced diameter portion for detachably engaging said spherical portion.

4. The arrangement according to claim 2, wherein said positioning pin and recess are inclined with respect to the normal to said contact surface.

5. The arrangement according to claim 1, wherein said engaging means is a nut buried within the air spoiler, and wherein said nut is located to come into registration with a hole provided in the vehicle body when said first positioning means is received by said second positioning means.

6. The arrangement according to claim 5, wherein said fixing means is a bolt which engages said nut.

7. The arrangement according to claim 6 wherein said vehicle body has an exterior portion to which the spoiler is secured and which has said second positioning means and said hole, and a cover plate which covers the interior side of said exterior portion.

8. An arrangement for securing an air spoiler to a vehicle body, comprising:
- an air spoiler including a contact surface which has a shape corresponding to the shape of an external surface of the vehicle body;
- a nut embedded within the air spoiler above the contact surface facing in the direction of said contact surface;
- a positioning pin having a projecting end extending toward the vehicle body from said contact surface and inclined with respect to the normal to the contact surface;
- a receiving recess formed in the vehicle body for determining the position of the air spoiler by receiving said positioning pin; and
- a bolt for engaging said nut in order to secure the nut to the vehicle body when said positioning pin has been received by the receiving recess.

9. The arrangement according to claim 8, wherein said positioning pin includes a generally spherical portion at its projecting end and the recess includes a reduced diameter portion for detachably engaging said spherical portion.

10. The arrangement according to claim 8 wherein said vehicle body has an exterior portion to which the spoiler is secured and which has said recess and a hole, the latter being located to come into registration with said nut, and a cover plate which covers the interior side of said exterior portion.

* * * * *